United States Patent
Furukawa et al.

(10) Patent No.: US 6,358,645 B1
(45) Date of Patent: Mar. 19, 2002

(54) NON-AQUEOUS ELECTROLYTE SECONDARY BATTERY

(75) Inventors: Yoshiaki Furukawa; Masayuki Endo, both of Fukushima (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/162,993

(22) Filed: Sep. 30, 1998

(30) Foreign Application Priority Data

Sep. 30, 1997 (JP) .............................. 9-267492

(51) Int. Cl.⁷ .......................... H01M 2/08; H01M 10/40
(52) U.S. Cl. ................. 429/174; 429/162; 429/185
(58) Field of Search ................. 429/171, 172, 429/173, 174, 185, 162

(56) References Cited

U.S. PATENT DOCUMENTS 4,302,517 A * 11/1981 Dziak .......................... 429/66
4,451,542 A * 5/1984 Ishida et al. ................ 429/174
5,658,692 A * 8/1997 Ohsaki et al. ............ 429/231.8

FOREIGN PATENT DOCUMENTS

| JP | 6-36772 | * | 2/1994 |
| JP | 6-36773 | * | 2/1994 |
| JP | 8-273640 | * | 10/1996 |
| JP | 8-339787 | * | 12/1996 |

* cited by examiner

*Primary Examiner*—Gabrielle Brouillette
*Assistant Examiner*—Jonathan Crepeau
(74) *Attorney, Agent, or Firm*—Sonnenschein, Nath & Rosenthal (57) ABSTRACT

A coin type non-aqueous electrolyte secondary battery having a structure that a pellet for forming a negative electrode accommodated in a can of the negative electrode and a pellet for forming a positive electrode accommodated in a can of the positive electrode are stacked to face each other through a separator and the cans of the two electrodes are caulked through a gasket so that the battery is sealed. The gasket has an outer annular portion held between the two cans and an inner annular portion facing the inside portion of the battery. A projection for supporting the pellet for forming the positive electrode is formed at a position of the inner surface of the inner annular portion opposite to the pellet for forming the positive electrode.

12 Claims, 4 Drawing Sheets

NON-AQUEOUS ELECTROLYTE SECONDARY BATTERY

BACKGROUND OF THE INVENTION

1. Field of the Invention

The present invention relates to a so-called coin type or button type non-aqueous electrolyte secondary battery, and more particularly to an improvement in a gasket.

2. Related Background Art

In recent years, the advancement of electronic technology results in an improvement in the performance of electronic apparatuses, size reduction of the same and enhancement in the portability. Therefore, secondary batteries having high energy densities for use in the electronic apparatuses have been required. Hitherto, the secondary batteries for use in the foregoing electronic apparatuses have been nickel-cadmium batteries, nickel-hydrogen batteries or the like. However, the foregoing batteries are unsatisfactory in viewpoints of obtaining those having low battery voltages and high energy densities.

To back up a memory, a coin type secondary battery has been put into practical use, and the battery comprises a negative electrode made of lithium or lithium alloy and a positive electrode made of oxide or hydrosulfide, such as molybdenum, vanadium, titanium or niobium, or spinel-type $LiMn_2O_4$ having an improved cycle characteristic of manganese oxide exhibiting a high energy density. However, the foregoing batteries are unsatisfactory in viewpoint of obtaining a very deep cyclic characteristic and load characteristic.

The battery comprising lithium as an active material of the negative electrode has a problem in that lithium deposits in the form of a dendrite because of charging and discharging reactions. It leads to a fact that deposited lithium penetrates a separator, causing internal shortcircuit to occur. The battery, having a structure that the active material of the negative electrode is the lithium alloy, suffers from a problem of deformation of the electrode due to expansion and contraction of the negative electrode which take place during charging and discharging operations.

As disclosed in Japanese Patent Laid-Open No. 62-90863, a non-aqueous electrolyte secondary battery having a structure that a carbonaceous material is employed as the active material of the negative electrode has been disclosed.

The foregoing non-aqueous electrolyte secondary battery uses doping and de-doping of lithium ions to and from spaces between carbon layers. In this case, the above-mentioned problems can be prevented which arise when lithium or the lithium ions are employed as the active material of the negative electrode and in which lithium in the form of a dendrite is deposited and the electrode is deformed. Therefore, it can be considered that an excellent cycle characteristic can be obtained. In the foregoing case, a material disclosed in Japanese Patent Laid-Open No. 63-135099 or Japanese Patent Laid-Open No. 1-304664 may be employed as the active material of the positive electrode. The disclosed material is composed of a lithium transition composition oxide expressed by, for example, $LixMO_2$ (where M is one or more types of transition metal elements and the relationship $0.05 \leq x \leq 1.10$ is satisfied). In this case, the capacity of the manufactured battery can be enlarged and thus a non-aqueous electrolyte secondary battery having a high energy density can be obtained.

Figure 1:
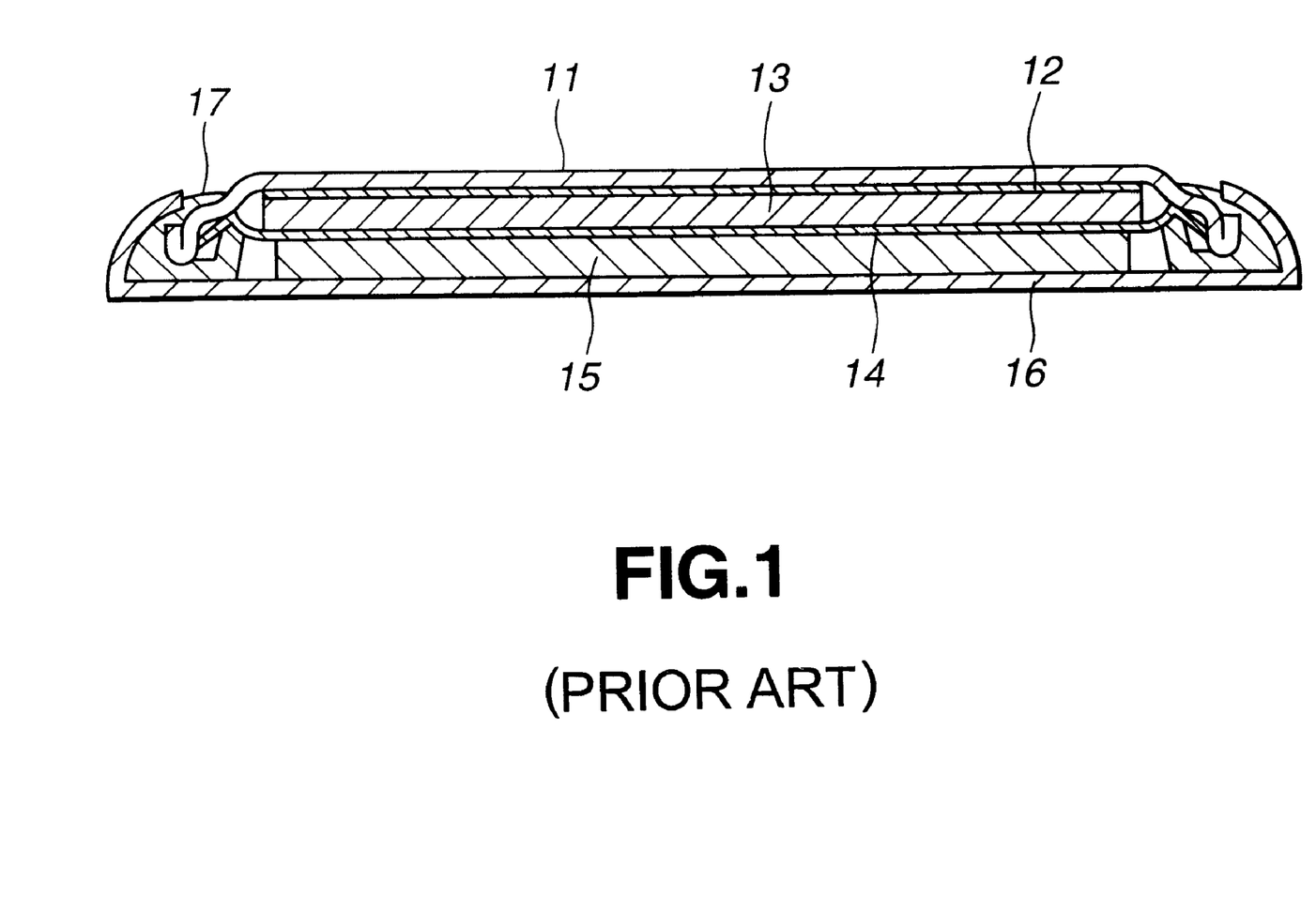
FIG. 1 is a schematic cross sectional view showing an example of a conventional non-aqueous electrolyte secondary battery.

FIG. 1 shows an example of a coin type battery having the foregoing structure that the active material of the negative electrode is a carbon material and the active material of the positive electrode is a lithium transition metal composite oxide.

The coin type battery is manufactured such that a binder is added to powder of the active material of the negative electrode, and then the two materials are mixed uniformly. Then, a thus obtained mixture for forming a negative electrode is pressed so as to be molded. Thus, a pellet 13 for forming the negative electrode is prepared, the negative electrode pellet being then accommodated in a negative electrode cup 11 made of stainless steel. A collector 12 of the negative electrode made of expand metal, such as nickel, is welded to the upper surface of the negative electrode cup 11. A separator 14 containing impregnated non-aqueous electrolyte is disposed on the pellet 13 for forming the negative electrode. On the other hand, a pellet 15 for forming the positive electrode is accommodated in a can 16 of the positive electrode, the pellet 15 being a pellet which has been manufactured by pressing and molding a mixture for forming the positive electrode prepared by adding a conductor and a binder to powder of an active material of the positive electrode and by mixing these materials. The negative electrode cup 11 is engaged to an opening of the can 16 of the positive electrode through a gasket 17. Then, the can 16 of the positive electrode is caulked so that the pellet 13 for forming the negative electrode, the separator 14, electrolyte and the pellet 15 for forming the positive electrode are sealed. Thus, the coin type battery as shown in FIG. 1 can be manufactured.

In the coin type battery having the structure that active material of the negative electrode is the carboneous material and the active material of the positive electrode is the lithium transition metal composite oxide, lithium ions de-doped from the positive electrode are occluded into the material of the negative electrode. Therefore, the battery is designed such that (the diameter of the pellet for forming the negative electrode)>(the diameter of the pellet for forming the positive electrode).

However, the conventional coin type battery sometimes encountered undesirable displacement of the position of the pellet for forming the positive electrode. It leads to a fact that the performance of the battery considerably deteriorates. If the pellet for forming the positive electrode is displaced and thus no pellet for forming the negative electrode exists at a position corresponding to the pellet for forming the positive electrode, there is apprehension that lithium is deposited in the form of dendrite on the cup of the negative electrode. As a result, there arises a problem in that charging and discharging ratios are lowered and thus deterioration in the capacity during the charging and discharging cycle becomes-more critical. If the battery is continuously charged, lithium deposited in the form of a dendrite is enlarged to penetrate the separator. In this case, there is apprehension that internal short circuit takes place.

SUMMARY OF THE INVENTION

In view of the foregoing, an object of the present invention is to provide a coin type battery non-aqueous electrolyte secondary battery which is capable of reliably preventing displacement of a pellet for forming the positive electrode with respect to the position of the pellet for forming the negative electrode to prevent deposition of lithium onto a cup of the negative electrode in the form of a dendrite so as to realize excellent charging discharging characteristics, continuous charging characteristic and productivity.

To achieve the above-mentioned object, according to the present invention, there is provided a non-aqueous electrolyte secondary battery comprising a pellet for forming a negative electrode accommodated in a can of the negative electrode and a pellet for forming a positive electrode accommodated in a can of the positive electrode which are stacked to face each other through a separator and having a structure that the can of the negative electrode and the can of the positive electrode are caulked through a separator so that the non-aqueous electrolyte secondary battery is sealed, wherein the gasket has an outer annular portion held between the can of the negative electrode and the can of the positive electrode and an inner annular portion facing the internal portion of the battery, and a projection for supporting the pellet for forming .the positive electrode is formed on the inner surface of the inner annular portion at a position opposite to the pellet for forming the positive electrode.

The projection formed on the inner surface of the inner annular portion of the gasket abuts against the outer surface of the pellet for forming the positive electrode so that the position of the pellet for forming the positive electrode is fixed. Therefore, undesirable displacement of the pellet for forming the positive electrode which occurs during assembly of the battery can be prevented.

Since displacement of the pellet for forming the positive electrode can be prevented, deposition of lithium to the negative electrode in the form of a dendrite can be prevented. Thus, charging and discharging characteristics and continuous charging characteristic can be prevented.

Moreover, the battery can easily be assembled and a manufacturing yield can be improved. Therefore, an advantage can be realized in a viewpoint of improving productivity.

Other objects, features and advantages of the invention will be evident from the following detailed description of the preferred embodiments described in conjunction with the attached drawings.

DESCRIPTION OF THE PREFERRED EMBODIMENTS

The structure of a non-aqueous electrolyte secondary battery according to the present invention will now be described with reference to the drawings.

Figure 2:
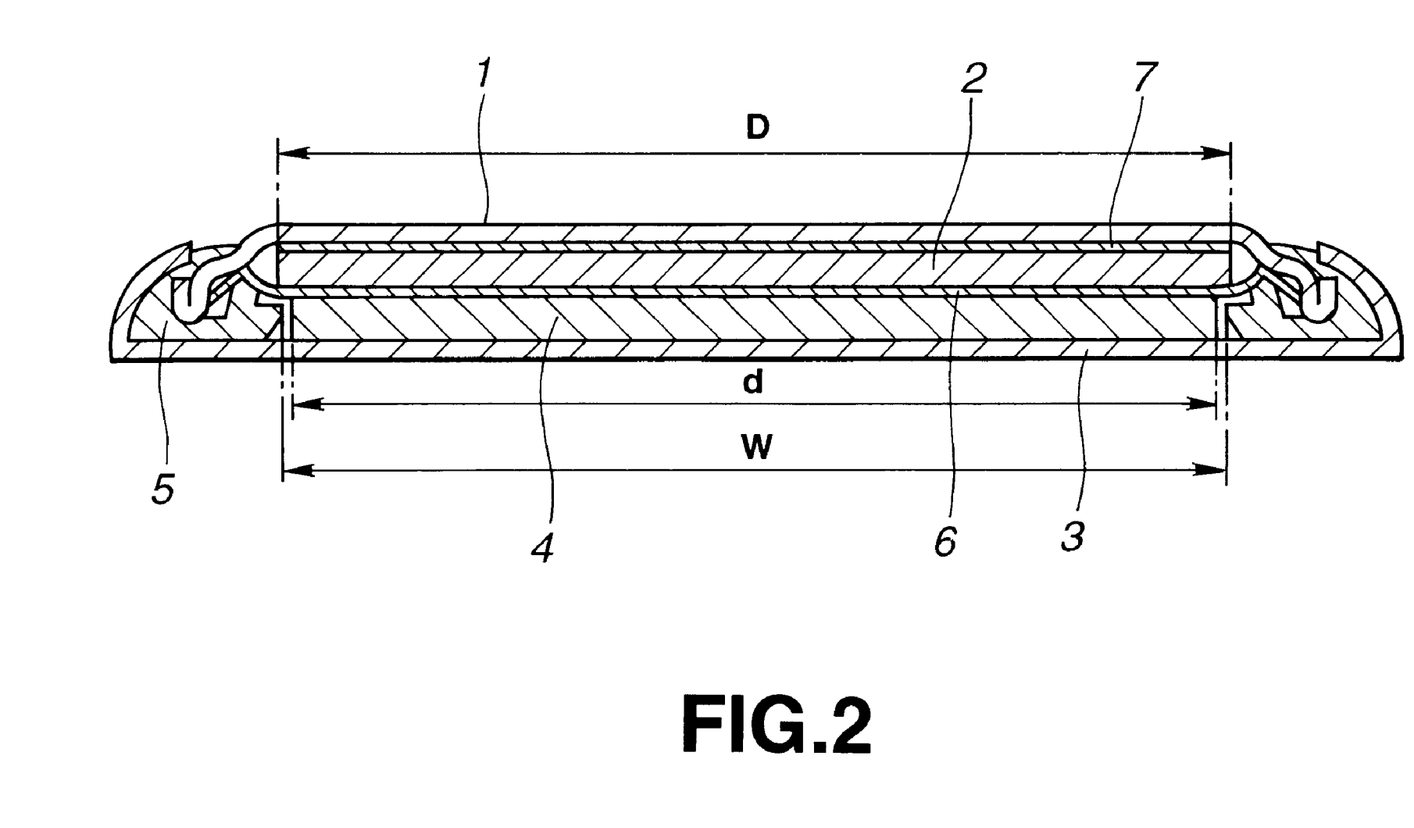
FIG. 2 is a schematic cross sectional view showing an example of the structure of a coin type battery non-aqueous electrolyte secondary battery according to the present invention.

As shown in FIG. 2, the non-aqueous electrolyte secondary battery according to the present invention comprises a negative electrode can 1 which accommodates a negative electrode pellet 2. A positive electrode can 3 of the non-aqueous electrolyte secondary battery accommodates a positive electrode pellet 4. The negative electrode can 1 and the positive electrode can 3 are caulked through a gasket 5 so that the non-aqueous electrolyte secondary battery is sealed. A separator 6 containing non-aqueous electrolyte impregnated therein for the purpose of causing battery reactions between the negative electrode pellet 2 and the positive electrode pellet 4 to smoothly occur is disposed between the negative electrode pellet 2 and the positive electrode pellet 4.

The negative electrode pellet 2 is prepared by adding a binder to powder of an active material of the negative electrode, by uniformly mixing powder and the binder and by pressing and molding the mixture. The negative electrode pellet 2 is brought into close contact with a collector 7 which is generally made of expand metal, such as nickel, and which is welded to the negative electrode can 1. Thus, conduction with the negative electrode can 1 can satisfactorily be maintained.

As an active material of the negative electrode, any one of known materials for use in a battery of the foregoing type can be employed. In particular, an excellent effect can be obtained if graphite, a graphitizable carbon material, a non-graphitizable carbon material, sintered carbon or a carbon material is employed.

The positive electrode pellet 4 can be prepared by adding a conductive material to powder of the active material of the positive electrode if necessary, and then, similarly to the negative electrode pellet 2, by adding a-binder and by mixing the materials uniformly. Then, the mixture is pressed and molded.

The active material of the positive electrode may be lithium transition metal composite oxide expressed by, for example, $Li_xMO_2$ (where M is one or more type of transition metal elements, such as Co, Ni and Mn and the relationship $0.05 \leq x \leq 1.10$ is satisfied). Specifically, lithium cobalt oxide, lithium nickel oxide, lithium manganese oxide or the like may be employed.

When the elements are assembled, the negative electrode pellet 2 is introduced into the negative electrode can 1. Then, a separator 6 containing non-aqueous electrolyte impregnated therein is mounted on the negative electrode pellet 2.

On the other hand, a positive electrode can 3 accommodating the positive electrode pellet 4 is prepared. The negative electrode can 1 is engaged to an opening of the positive electrode can 3 through the gasket 5. Then, the positive electrode can 3 is caulked. Thus, the negative electrode pellet 2 and the positive electrode pellet 4 are brought into close contact with the inner surfaces of the negative electrode can 1 and the positive electrode can 3, respectively. As a result, the non-aqueous electrolyte secondary battery is sealed.

The non-aqueous electrolyte secondary battery has the above-mentioned basic structure. The non-aqueous electrolyte secondary battery according to the present invention is characterized in the shape and the structure of the gasket 5. The shape of the gasket 5 will now be described.

The gasket 5 has a basic structure in an annular form made of an elastic material, for example, resin, rubber or the like. The gasket 5 is placed between the negative electrode can 1 and the positive electrode can 3 when the caulking process is performed. Thus, a required sealing characteristic can be maintained so that liquid leakage and the like is prevented.

Figure 3:
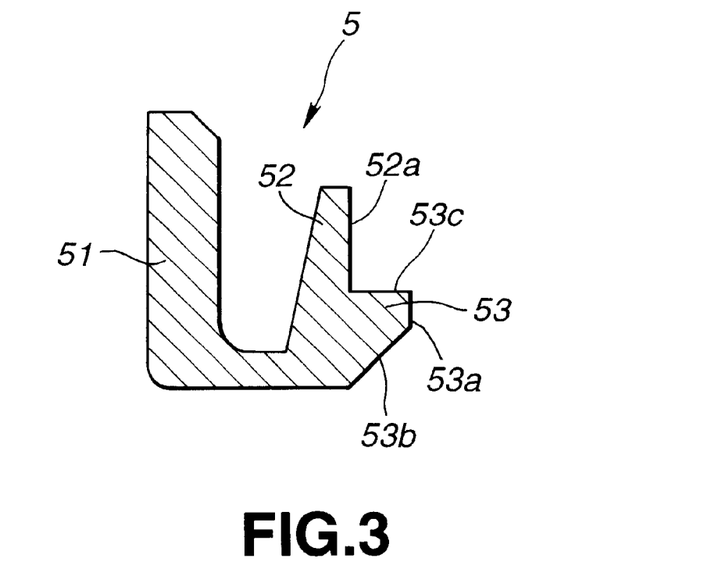
FIG. 3 is a cross sectional view showing an example of the cross sectional shape of a gasket.

FIG. 3 shows a cross sectional shape of the gasket 5. The gasket 5 according to the present invention comprises an outer annular portion 51 which is pressed between the negative electrode can 1 and positive electrode can 3 when the caulking process is performed; and an inner annular portion 52 which faces the inside portion of the battery after the gasket 5 has been inserted into the battery.

The upper end of the inner annular portion 52 is brought into contact with the separator 6 so that the negative electrode pellet 2 is accommodated in a space surrounded by the inner annular portion 52.

A projection 53 inwards projecting (therefore toward the positive electrode pellet 4) is formed on an inner surface 52a of the inner annular portion 52, the projections 53 being formed at a position facing the positive electrode pellet 4. A front surface 53a of the projections 53 is positioned so that considerable displacement of the position of the positive electrode pellet 4 from the negative electrode pellet 2 is prevented.

Figure 4:
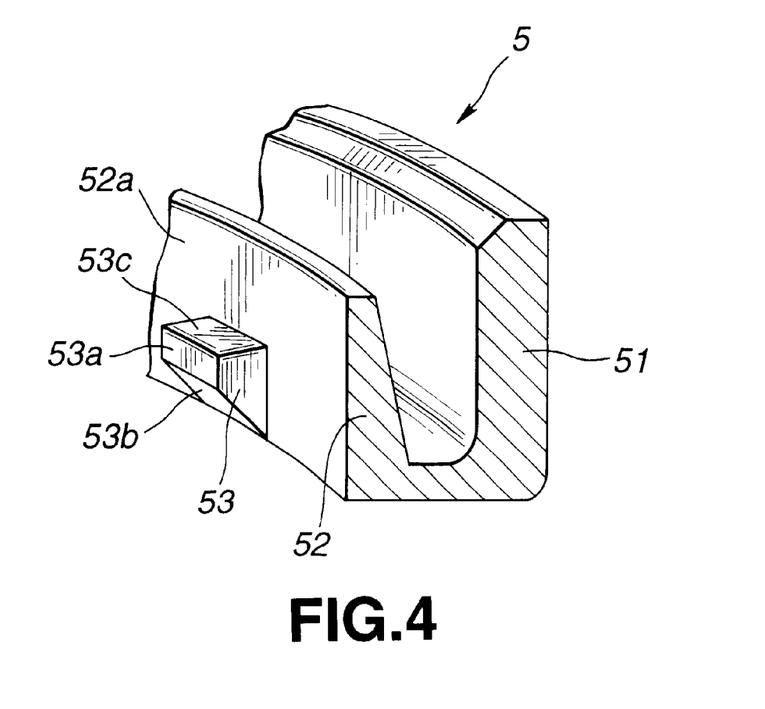
FIG. 4 is a perspective view partially showing an example of a gasket having a plurality of projections.
Figure 5:
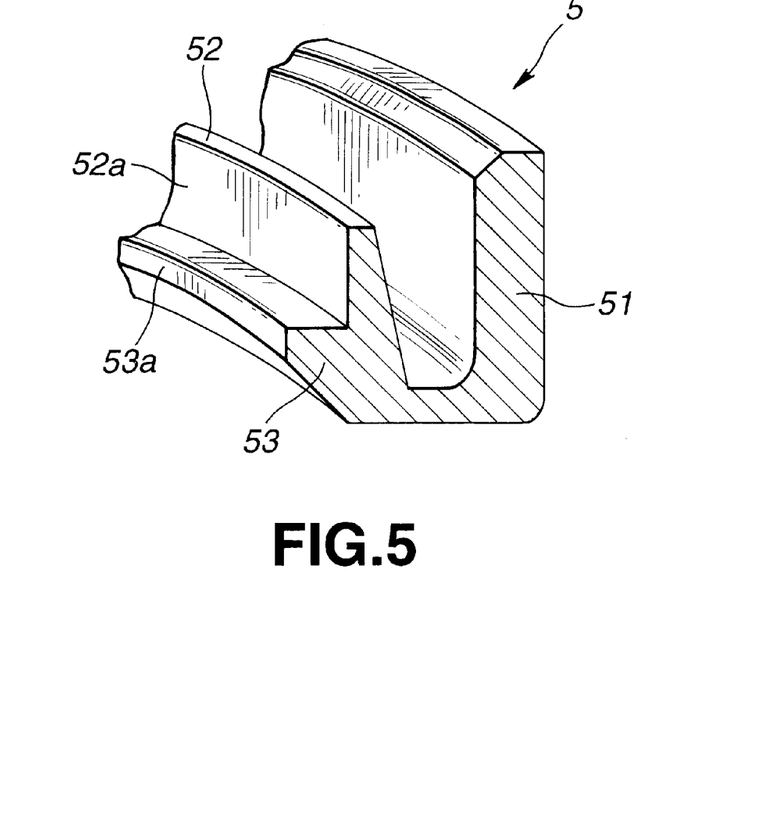
FIG. 5 is a partial perspective view showing an example of a gasket having a projection formed around the gasket.

As shown in FIG. 4, the projections 53 may be a plurality of independent projections 53. As shown in FIG. 5, the projection 53 may be formed on the overall inner surface 52a of the inner annular portion 52. When the plural independent projections 53 are formed, it is preferable that the projections 53 are formed at equal angular intervals. If two projections 53 are formed, the angular interval is made to be 180°. When three projections 53 are formed, the angular intervals are 120°. When four projections 53 are formed, the annular intervals are 90°.

Since the projections 53 are provided for the purpose of positioning the positive electrode pellet 4, it is preferable that accurate dimensions of the projections 53 are maintained.

That is, diameter W (see FIG. 2) of an inscribed circle which is tangent to the front surface 53a of the projections 53 is made to be somewhat larger than outer diameter d of the positive electrode pellet 4. Moreover, the diameter W is made to be smaller than outer diameter D of the negative electrode pellet 2. That is, the diameters are designed to satisfy the relationship D>W>d.

As a result, the positive electrode pellet 4 can reliably be positioned so that generation of a dendrite which takes place when displacement from the negative electrode pellet 2 takes place is prevented.

The "inscribed circle" which is tangent to the front surface 53a of the projections 53 is an inscribed circle surrounded by the front surface 53a of each of the projections 53 when the plural projections 53 are formed as shown in FIG. 4. When the projection 53 is formed around the inner surface 52a of the inner annular portion 52 as shown in FIG. 5, the inscribed circle is an inscribed circle formed by the front surface 53a.

It is preferable that a surface 53b of the projections 53 adjacent to the positive electrode can 3 is formed into an inclined surface which is gradually apart from the inner surface of the positive electrode can 3 to approach the positive electrode pellet 4. As a result, any problem can be prevented during the assembling operation.

It is preferable that an upper surface (a surface adjacent to the negative electrode can 1) 53c is formed into a so-called stepped shape with respect to the inner annular portion 52. When the upper surface 53c is formed as described above, the negative electrode pellet 2 can stably be supported by the inner surface 52a and the upper surface 53c of the inner annular portion 52. As a result, the relative position of the positive electrode pellet 4 with respect to the negative electrode pellet 2 can furthermore be fixed.

EXAMPLES

Examples of the present invention will now be described with results of experiments Example 1

Cobalt carbonate and lithium carbonate were mixed at a ratio of Li/Co=1, and then the mixture was baked in the air at 900° C. for 5 hours. Thus, $LiCoO_2$ was obtained. The obtained compound was X-ray diffraction. The results were such that agreement with the JPDS card was extremely good.

Then, 91 wt % of obtained $LiCoO_2$, 6 wt % of graphite which was a conductive material and 3 wt % of vinylidene fluoride which was a binder were mixed so that a mixture for forming the positive electrode was prepared. Then, the mixture for forming the positive electrode was dispersed in N-methyl-2-pyrolidone which is a solvent. Thus, paste for forming the positive electrode was prepared.

The paste for forming the positive electrode was dried, and then molded into a disc having a diameter of 15.5 mm and a height of 0.9 mm. Thus, a pellet for forming the positive electrode was manufactured.

On the other hand, a pellet for forming the negative electrode was manufactured as follows.

Petroleum pitch was employed as a starting material of an active material of the negative electrode. Then, 10% to 20% of a functional group containing oxygen was introduced into petroleum pitch (oxygen crosslinked). Then, the mixture was baked at 1000° C. in inert gas. The obtained non-graphitizable carbon material having a characteristic similar to the characteristic of a vitreous carbon material was employed as the active material of the negative electrode.

Then, 95 wt % of the non-graphitizable carbon material and 5 wt % of polyvinylidene fluoride were mixed so that a mixture for forming the negative electrode was prepared. Then, the mixture was dispersed in N-methyl-2-pyrolidone so that paste for forming the negative electrode was prepared. The prepared paste for forming the negative electrode was dried, and then molded into a disc shape having an outer diameter of 16.5 mm and a height of 0.8 mm. Thus, a pellet for forming the negative electrode was prepared.

The obtained pellet for forming the negative electrode was introduced into a cup for the negative electrode in which a collector of the negative electrode made of expand metal, such as nickel, was spot-welded. Then, a separator made of unwoven polypropylene having required dimensions and obtained by a punching work was placed on the cup of the negative electrode, and then held between polypropylene gaskets so as to be inserted into the cup of the negative electrode. Thus, the negative electrode was manufactured.

The gasket according to this example had a structure as shown in FIGS. 3 and 4. The inner diameter of the inner annular portion was 16.8 mm. The foregoing gasket had three projections formed at angular intervals of 120°. Each projection had a width of 2.0 mm and a height of 0.4 mm. Therefore, the diameter of an inscribed circle tangent to the front surface of the projection was 16.0 mm.

Electrolyte was dropped to the negative electrode, and then the positive electrode was disposed. The positive electrode had the can of the positive electrode which accommodated the pellet for forming the positive electrode. The can of the negative electrode was engaged to an opening of the can of the positive electrode through the gasket. Then, the can of the positive electrode was caulked so as to be sealed. As a result, a coin type non-aqueous electrolyte secondary battery as shown in FIG. 1 was manufactured.

The outer diameter of the manufactured coin type battery non-aqueous electrolyte secondary battery was 20 mm and the height was 2.5 mm. Fifty coin type battery non-aqueous electrolyte secondary batteries were manufactured. Manufactured batteries were free from any problem.

Example 2

A gasket having four projections on the inner annular portion at angular intervals of 90° was employed. Similarly to Example 1, fifty coin type battery non-aqueous electrolyte secondary batteries were manufactured. The manufactured batteries were free from any problem.

The number of the projections of the gasket according to this example was different from that according to Example 1. The dimensions, the shape and so forth of the gasket according to this example were the same as those of the gasket according to Example 1.

Example 3

A gasket having five projections on the inner annular portion at angular intervals of 72° was employed. Similarly to Example 1, fifty coin type battery non-aqueous electrolyte secondary batteries were manufactured. The manufactured batteries were free from any problem.

The number of the projections of the gasket according to this example was different from that according to Example 1. The dimensions, the shape and so forth of the gasket according to this example were the same as those of the gasket according to Example 1.

Example 4

A gasket having a projection formed around the inner annular portion as shown in FIG. 5 was employed. Similarly to Example 1, fifty coin type battery non-aqueous electrolyte secondary batteries were manufactured. The manufactured batteries were free from any problem.

The height of the projection formed on the gasket was 0.4 mm and the inner diameter of the inner surface formed by the front surface of the projection was 16.0 mm.

Example 5

A gasket having two projections on the inner annular portion at an angular interval of 180° was employed. Similarly to Example 1, fifty coin type battery non-aqueous electrolyte secondary batteries were manufactured. The manufactured batteries were free from any problem.

The number of the projections of the gasket according to this example was different from that according to Example 1. The dimensions, the shape and so forth of the gasket according to this example were the same as those of the gasket according to Example 1.

Example 6

Figure 6:
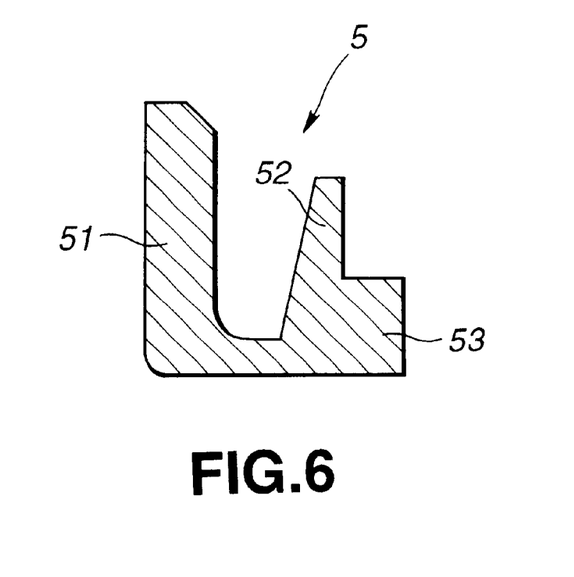
FIG. 6 is a cross sectional view showing another example of the cross sectional shape of the gasket.

A gasket having a shape as shown in FIG. 6 was employed. Similarly to Example 1, fifty coin type battery non-aqueous electrolyte secondary batteries were manufactured. There arisen problems at a rate of 10/50 when the pellet for forming the positive electrode was disposed.

Although the gasket had a projection similar to Example 1 and similar dimensions and shape, the surface of the projection adjacent to the positive electrode was not inclined. The foregoing surface was a flat surface continued to the outer annular portion and the bottom surface of the inner annular portion, the foregoing flat surface being tangent to the can of the positive electrode.

Comparative Example 1

A gasket having no projection on the inner annular portion was employed. The other portions were the same as those of the gasket according to Example 1. Similarly to Example 1, fifty coin type battery non-aqueous electrolyte secondary batteries were manufactured. The manufactured batteries were free from any problem.

The gasket was different from that according to Example 1 in that the projection was omitted. The dimensions, the shape and so forth of the gasket according to this example were the same as those of the gasket according to Example 1.

Comparative Example 2

A gasket having one projection on the inner annular portion was employed. The other portions were the same as those of the gasket according to Example 1. Similarly to Example 1, fifty coin type battery non-aqueous electrolyte secondary batteries were manufactured. The manufactured batteries were free from any problem.

The dimensions, the shape and so forth of the gasket according to this example were the same as those of the gasket according to Example 1. Since only one projection is provided, there is apprehension that the pellet for forming the positive electrode was deviated.

Comparative Example 3

The outer diameters of the pellet for forming the positive electrode and the pellet for forming the negative electrode were changed. The other portions were the same as those of the gasket according to Example 1. Similarly to Example 1, fifty coin type battery non-aqueous electrolyte secondary batteries were manufactured. The manufactured batteries were free from any problem.

In this comparative example, the outer diameter of the pellet for forming the negative electrode was 15.5 mm and the outer diameter of the pellet for forming the positive electrode was 14.5 mm. Therefore, the diameter of the inscribed circle tangent to the front surface of the projection was larger than the outer diameter of the pellet for forming the negative electrode.

Evaluation

The batteries according to the examples and comparative examples were subjected to charging and discharging cycle tests and continuous charging test. Twenty battery samples were subjected to the foregoing tests to obtain average values. The charging and discharging test was performed such that a constant electric current of 2 mA was allowed to flow until the voltage level was raised to 4.0 V. Then, a load of 3 kΩ was applied to discharge the battery until the voltage level was lowered to 2.0 V. The foregoing charging and discharging cycle was repeated 50 cycles at 23° C. After 50 cycles were completed, a capacity retention ratio with respect to an initial charging and discharging capacity was obtained. The continuous charging test was performed such that continuous charging was performed at 60° C. with a voltage of 4.0 V for 20 days. Then, the battery was discharged with a load of 3 kΩ at 23° C. until the voltage level was lowered to 2.0 V. Thus, a discharge capacity retention ratio with respect to an initial discharge capacity was measured. Results were shown in Table 1.

TABLE 1

|  | Discharge Capacity Retention Ratio (%) After 50 Cycles | Discharge Capacity Retention Ratio (%) After Continuous Charging |
|---|---|---|
| Example 1 | 95 | 85 |
| Example 2 | 95 | 85 |
| Example 3 | 95 | 85 |
| Example 4 | 95 | 85 |

TABLE 1-continued

|  | Discharge Capacity Retention Ratio (%) After 50 Cycles | Discharge Capacity Retention Ratio (%) After Continuous Charging |
|---|---|---|
| Example 5 | 93 | 82 |
| Example 6 | 95 | 85 |
| Comparative Example 1 | 70 | 40 |
| Comparative Example 2 | 85 | 65 |
| Comparative Example 3 | 70 | 40 |

As can be understood from Table 1, the batteries according to Examples 1 to 6 have improved charging and discharging cycle characteristics as compared with those according to the comparative examples. The reason for this can be considered such that each battery according to the example is free from displacement of the pellet for forming the positive electrode and thus the pellet for forming the negative electrode exists at the opposite surface without exception. Therefore, deposition of lithium in the form of dendrite on the inner surface of the cup of the negative electrode can be prevented. In actual, the battery according to each of the examples had a considerably high capacity retention ratio of 95% or higher as compared with those of the comparative examples. Therefore, the charging and discharging cycle characteristics were considerably improved.

The retention ratio of the discharge capacity after the continuous charging test will now be considered. The batteries according to Examples 1 to 6 have higher retention ratios as compared with those of the comparative examples. The reason for this can be considered that deposition of dendrite of lithium was prevented. Thus, the continuos charging characteristic was improved.

Although the battery according to Example 6 had an improved characteristic, some problem arises when the assembling process was performed. Therefore, it is preferable that the surface of the projection adjacent to the can of the positive electrode is inclined.

The battery according to the comparative example 2 had somewhat lowered retention ratio of the discharge capacity though the degree of lowered was lower than those of the other comparative examples. The reason for this lies in that since only one projection was provided, the position of the pellet for forming the positive electrode was deviated. Therefore, it is preferable that a plurality of projections are formed.

The batteries according to the examples and the comparative examples are decomposed after the charging and discharging cycle test and the continuous charging test had been completed. The batteries according to the examples were free from any change after the tests. The batteries according to the Comparative Examples 1 to 3 encountered deposition of lithium in the form of dendrite at positions adjacent to the can of the negative electrode.

As can be understood from the description, displacement of the pellet for forming the positive electrode with respect to the pellet for forming the negative electrode can reliably be prevented. Moreover, deposition of lithium in the form of dendrite to the cup of the negative electrode can be prevented. Therefore, the non-aqueous electrolyte secondary battery having excellent charging and discharging cycle characteristics, continuous charging characteristic and productivity can be provided.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A non-aqueous electrolyte secondary battery, comprising:
    (a) a can of a negative electrode;
    (b) a pellet being arranged to form the negative electrode and accommodated in the can of the negative electrode;
    (c) a can of a positive electrode;
    (d) a pellet being arranged to form the positive electrode and accommodated in the can of the positive electrode;
    (e) a separator disposed between the pellet for forming the negative electrode and the pellet for forming the positive electrode and arranged to face the pellet for forming the negative electrode and the pellet for forming the positive electrode; and
    (f) an annular sealing gasket which is effective when the can of the negative electrode and the can of the positive electrode are caulked, with the separator sitting atop the gasket;
    (g) the gasket having an outer annular portion held between the can of the negative electrode and the can of the positive electrode, an inner annular portion facing an inside portion of the non-aqueous electrolyte secondary battery and a projection for supporting the pellet for forming the positive electrode so that the pellet for forming the positive electrode is supported on the inner surface of the inner annular portion at a position opposite to the pellet for forming the positive electrode,
    (h) the pellet for forming the negative electrode containing a carbon material for doping/dedoping lithium as an active material of the negative electrode, and the pellet for forming the positive electrode containing a lithium composite oxide as an active material of the positive electrode;
    (i) wherein the pellet for forming the positive electrode abuts a front face of the projection for supporting the pellet for forming the positive electrode; and
    (j) wherein when a diameter of an inscribed circle tangent to a front surface of said projection formed on said gasket is W, an outer diameter of said pellet for forming the negative electrode is D and an outer diameter of said pellet for forming the positive electrode is d, a relationship D>W>d is satisfied.

2. A non-aqueous electrolyte secondary battery according to claim 1, wherein said projection is formed around the inner surface of said inner annular portion.

3. A non-aqueous electrolyte secondary battery according to claim 1, wherein a surface of said projection adjacent to said can of said positive electrode is formed into an inclined surface toward said pellet for forming the positive electrode.

4. A non-aqueous electrolyte secondary battery, comprising:
    (a) a can of a negative electrode;
    (b) a pellet being arranged to form the negative electrode and accommodated in the can of the negative electrode;
    (c) a can of a positive electrode;
    (d) a pellet being arranged to form the positive electrode and accommodated in the can of the positive electrode;
    (e) a separator disposed between the pellet for forming the negative electrode and the pellet for forming the positive electrode and arranged to face the pellet for forming the negative electrode and the pellet for forming the positive electrode; and (f) an annular sealing gasket which is effective when the can of the negative electrode and the can of the positive electrode are caulked, with the separator sitting atop the gasket;

(g) the gasket having an outer annular portion held between the can of the negative electrode and the can of the positive electrode, an inner annular portion facing an inside portion of the non-aqueous electrolyte secondary battery and a plurality of projections for supporting the pellet for forming the positive electrode so that the pellet for forming the positive electrode is supported on the inner surface of the inner annular portion at a position opposite to the pellet for forming the positive electrode, (h) the pellet for forming the negative electrode containing a carbon material for doping/dedoping lithium as an active material of the negative electrode, and the pellet for forming the positive electrode containing a lithium composite oxide as an active material of the positive electrode;

(i) wherein the pellet for forming the positive electrode abuts a front face of the plurality of projections for supporting the pellet for forming the positive electrode; and (j) wherein the plurality of projections are formed on the inner surface of the inner annular portion.

5. A non-aqueous electrolyte secondary battery, comprising:

(a) a can of a negative electrode;

(b) a pellet being arranged to form the negative electrode and accommodated in the can of the negative electrode;

(c) a can of a positive electrode;

(d) a pellet being arranged to form the positive electrode and accommodated in the can of the positive electrode;

(e) a separator disposed between the pellet for forming the negative electrode and the pellet for forming the positive electrode and arranged to face the pellet for forming the negative electrode and the pellet for forming the positive electrode; and (f) an annular sealing gasket which is effective when the can of the negative electrode and the can of the positive electrode are caulked, with the separator sitting atop the gaskets (g) the gasket having an outer annular portion held between the can of the negative electrode and the can of the positive electrode, an inner annular portion facing an inside portion of the non-aqueous electrolyte secondary battery and a projection for supporting the pellet for forming the positive electrode so that the pellet for forming the positive electrode is supported on the inner surface of the inner annular portion at a position opposite to the pellet for forming the positive electrode, (h) the pellet for forming the negative electrode containing a carbon material for doping/dedoping lithium as an active material of the negative electrode, and the pellet for forming the positive electrode containing a lithium composite oxide as an active material of the positive electrode;

(i) wherein the pellet for forming the positive electrode abuts a front face of the projection for supporting the pellet for forming the positive electrode; and (j) wherein the projection extends radially inward from the inner surface of the inner annular portion and has an inclined surface extending from adjacent the can for the positive electrode and an upper surface forming a stepped shape with an upper edge of the inner annular portion.

6. A non-aqueous electrolyte secondary battery according to claim 5, wherein a collector is disposed between the pellet for forming the negative electrode and the can of the negative electrode.

7. A non-aqueous electrolyte secondary battery, comprising:

(a) a can of a negative electrode;

(b) a pellet being arranged to form the negative electrode and accommodated in the can of the negative electrode;

(c) a can of a positive electrode;

(d) a pellet being arranged to form the positive electrode and accommodated in the can of the positive electrode;

(e) a separator disposed between the pellet for forming the negative electrode and the pellet for forming the positive electrode and arranged to face the pellet for forming the negative electrode and the pellet for forming the positive electrode; and (f) an annular sealing gasket which is effective when the can of the negative electrode and the can of the positive electrode are caulked, with the separator sitting atop the gasket;

(g) the gasket having an outer annular portion held between the can of the negative electrode and the can of the positive electrode, an inner annular portion facing an inside portion of the non-aqueous electrolyte secondary battery and a plurality of projections for supporting the pellet for forming the positive electrode so that the pellet for forming the positive electrode is supported on the inner surface of the inner annular portion at a position opposite to the pellet for forming the positive electrode, (h) the pellet for forming the negative electrode containing a carbon material for doping/dedoping lithium as an active material of the negative electrode, and the pellet for forming the positive electrode containing a lithium composite oxide as an active material of the positive electrode;

(i) wherein the pellet for forming the positive electrode abuts a front face of the plurality of projections for supporting the pellet for forming the positive electrode;

(j) wherein the plurality of the projections are formed on the inner surface of the inner annular portion; and (j) wherein each of the plurality of projections extends radially inward from the inner surface of the inner portion and has an inclined lower surface extending from adjacent the can for the positive electrode and an upper surface forming a stepped shape with an upper edge of the inner annular portion.

8. A non-aqueous electrolyte secondary battery according to claim 7, wherein a collector is disposed between the pellet for forming the negative electrode and the can of the negative electrode.

9. A non-aqueous electrolyte secondary battery, comprising:

(a) a can of a negative electrode;

(b) a can of a positive electrode;

(c) a pellet arranged to form the negative electrode, accommodated in the can of the negative electrode and containing a binder and an active material being selected from the group consisting of graphite, graphitizable carbon material, non-graphitizable carbon material and sintered carbon;

(d) a pellet arranged to form the positive electrode accommodated in the can of the positive electrode and containing an active material of the positive electrode and a binder, the active material of the positive electrode being a transition metal composite oxide expressed by $Li_xMO_2$ with M being one or more transition metal elements including Co, Ni, and Mn with $0.05<x<1.10$;

(e) a separator being disposed between the pellet for forming the negative electrode and the pellet for forming the positive electrode and arranged to face the pellet for forming the negative electrode and the pellet for forming the positive electrode;

(f) an annular sealing gasket which is effective when the can of the negative electrode and the can of the positive electrode are caulked; and with the separator sitting atop the gasket;

(g) an electrolyte;

(h) the gasket having an outer annular portion held between the can of the negative electrode and the can of the positive electrode, an inner annular portion facing an inside portion of the non-aqueous electrolyte secondary battery and a projection for supporting the pellet for forming the positive electrode so that the pellet for forming the positive electrode is supported on the inner surface of the inner annular portion at a position opposite to the pellet for forming the positive electrode;

(i) wherein the pellet for forming the positive electrode abuts a front face of the projection for supporting the pellet for forming the positive electrode; and (j) wherein the projection extends radially inward from the inner surface of the inner annular portion and has a lower surface inclined to the can for the positive electrode and a stepped upper surface relative to the upper edge of the inner annular portion.

10. A non-aqueous electrolyte secondary battery according to claim 9, wherein a collector is disposed between the pellet for forming the negative electrode and the can of the negative electrode.

11. A non-aqueous electrolyte secondary battery, comprising:

(a) a can of a negative electrode;

(b) a can of a positive electrode;

(c) a pellet arranged to form the negative electrode, accommodated in the can of the negative electrode and containing a binder and an active material being selected from the group consisting of graphite, graphitizable carbon material, non-graphitizable carbon material and sintered carbon;

(d) a pellet arranged to form the positive electrode accommodated in the can of the positive electrode and containing an active material of the positive electrode and a binder, the active material of the positive electrode being a transition metal composite oxide expressed by $Li_xMO_2$ with M being one or more transition metal elements including Co, Ni, and Mn with $0.05<x<1.10$;

(e) a separator being disposed between the pellet for forming the negative electrode and the pellet for forming the positive electrode and arranged to face the pellet for forming the negative electrode and the pellet for forming the positive electrode;

(f) an annular sealing gasket which is effective when the can of the negative electrode and the can of the positive electrode are caulked; and with the separator sitting atop the gasket;

(g) an electrolyte;

(h) the gasket having an outer annular portion held between the can of the negative electrode and the can of the positive electrode, an inner annular portion facing an inside portion of the non-aqueous electrolyte secondary battery and a plurality of projections for supporting the pellet for forming the positive electrode so that the pellet for forming the positive electrode is supported on the inner surface of the inner annular portion at a position opposite to the pellet for forming the positive electrode;

(i) wherein the pellet for forming the positive electrode abuts a front face of each of the plurality of projections for supporting the pellet for forming the positive electrode; and (j) wherein each of the plurality of projections extends radially inward from the inner surface of the inner annular portion and has a lower surface inclined to the can for the positive electrode and a stepped upper surface relative to the upper edge of the inner annular portion.

12. A non-aqueous electrolyte secondary battery according to claim 11, wherein a collector is disposed between the pellet for forming the negative electrode and the can of the negative electrode.

* * * * *